Figure 1:
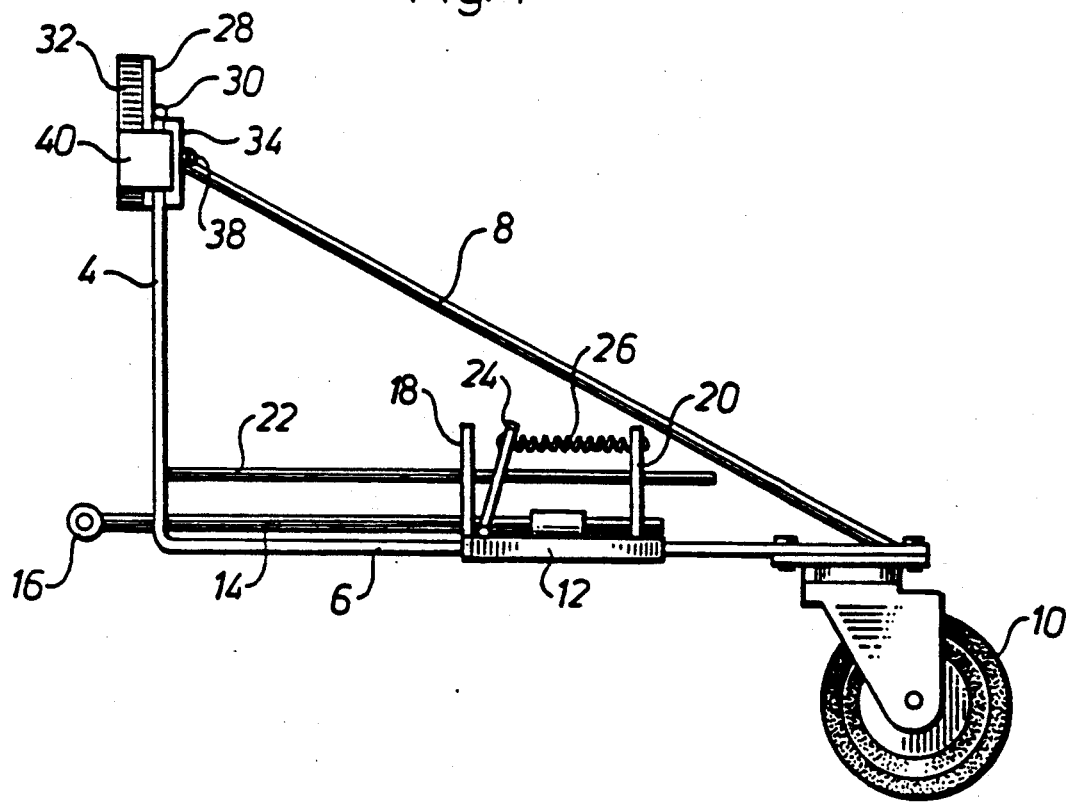

United States Patent [19]

Ljungberg

[11] Patent Number: 5,215,321
[45] Date of Patent: Jun. 1, 1993

[54] TRANSPORT DEVICE FOR MOVING OBJECTS

[76] Inventor: Gösta Ljungberg, Erikslundsvägen 26, S-770 73 Garpenberg, Sweden

[21] Appl. No.: 778,956
[22] PCT Filed: Jul. 5, 1990
[86] PCT No.: PCT/SE90/00456
   § 371 Date: Dec. 30, 1991
   § 102(e) Date: Dec. 30, 1991
[87] PCT Pub. No.: WO91/00430
   PCT Pub. Date: Jan. 10, 1991

[30] Foreign Application Priority Data

Jul. 4, 1989 [SE] Sweden ................. 8902413

[51] Int. Cl.⁵ .................................. B62B 1/12
[52] U.S. Cl. ................... 280/47.131; 16/31 R; 280/47.2
[58] Field of Search ........... 280/47.131, 47.16, 47.2, 280/47.32, 763.1; 16/30, 31 R, 31 A

[56] References Cited

U.S. PATENT DOCUMENTS 3,105,698 10/1963 Bonarrigo et al. ............ 280/47.131
3,761,107 9/1973 Docherty et al. ..................... 16/30
4,815,760 3/1989 Dooley .......................... 280/47.131

Primary Examiner—Richard M. Camby
Attorney, Agent, or Firm—Townsend and Townsend Khourie and Crew

[57] ABSTRACT

A transport device for moving objects standing on legs having a support unit for a leg (42) of the object. The unit includes a support frame (2), a wheel (10), and a leg engaging apparatus (14, 16, 28, 32, 40) arranged on the support frame at sidewards distance from the wheel. The leg engagement apparatus (16, 28) includes a surface for engaging the leg (42) with the surface force increasing with the load applied by the object on the frame (2). The transport device also includes a side support for supporting the leg transversely to the direction of the load applied by the object on the frame (2).

13 Claims, 2 Drawing Sheets

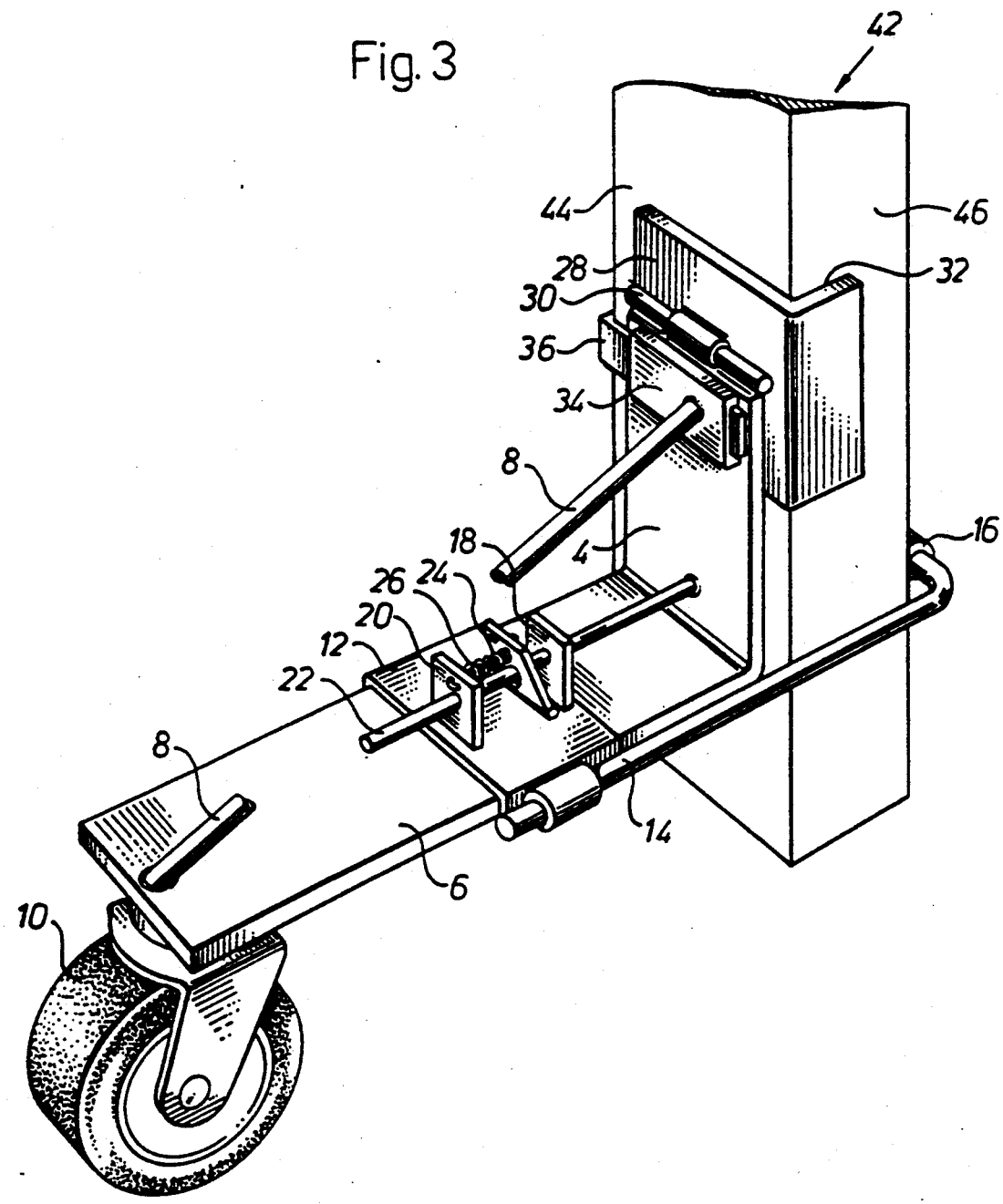

TRANSPORT DEVICE FOR MOVING OBJECTS

The present invention relates to a transport device for moving objects carried on legs.

Often movement of such objects on floors of hard material is carried through by dragging the object on the floor or carrying it by one or more persons. This is laborous and often implies a heavy load on back, joints and muscles.

The object of the invention is to provide a device of the kind started by way of introduction, that simplifies movement of heavy objects and thereby decreases the risk of stress injuries of different kinds on the body, as well as the number of persons required for carrying through the movement.

This object has been attained with the transport device according to the invention in that it is characterized by a support unit for a leg of the object, said unit including a support frame, wheel means carrying said support frame, and leg engagement means arranged on the support frame at a sideward distance from said wheel means.

Said leg engagement means may include means designed for surface engagement with the leg with a force that increases with the force excerted by the object on the frame, and suitably also means designed for support of the leg transversely to the direction of the load exerted by the object on the frame.

Figure 2:
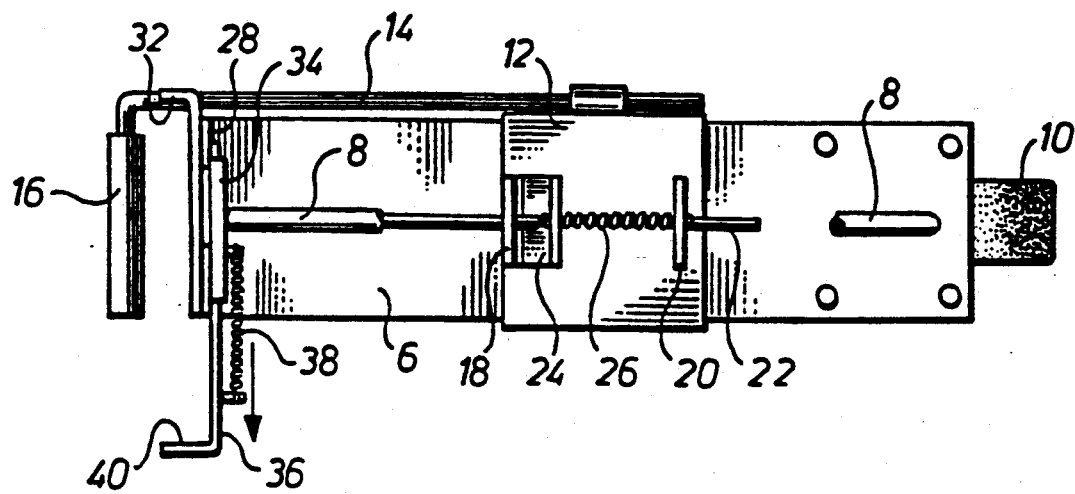

The invention shall now be described more closely with reference to the attached drawings, which schematically show an embodiment, and on which FIG. 1 is a side view, FIG. 2 is a view from above, and FIG. 3 is a perspective view intended to illustrate use of this embodiment of the transport device according to the invention.

The illustrated transport device forms a support unit for a leg of an object to be moved. It includes a support frame generally designated 2 and consisting of an essentially perpendicularly bent flat iron with a long and a short branch 4 and 6, respectively, and a support strut 8 extending between the ends of the flat iron branches 4 and 6. On the underside of the free end of the flat iron branch 6 a support wheel 10 is arranged to be pivotal 360 degrees. On the upper side of the flat iron branch 6 is movable slide 12 is arranged, the branch 6 serving as a guide for said slide by virtue of the fact that side portions of the slide partly extend around the longitudinal edges of the branch 6. The slide 12 along one side thereof carries a long branch 14 of an essentially perpendicularly bent catch arm, a shorter branch 16 of which extends transversely to the flat iron branch 4 on the side of the flat iron branch 4 remote from the flat iron branch 6, as shown in FIG. 2. The catch arm 14, 16, the function of which will be described more closely below, is thus arranged to follow the movements of the slide.

A control and lock device for the movement of the slide 12 comprises two flat iron plates 18 and 20, respectively, which are attached on the upper side of the slide in an upright position at a distance from each other. A guide rod 22 parallel to the flat iron branch 6 extends with play through the plates 18 and 20 and is attached to the flat iron branch 4 with one of its ends. Between the plates 18 and 20 the guide rod 22 extends through a lock plate 24, the lower end of which is tiltably supported on the slide 12 close to the plate 18 and the upper end of which is connected to the plate 20 by means of a draw spring 26. When the lock plate 24 is in an upright position as opposed to the tilted position shown in FIG. 2, it receives the guide rod 22 with play, but is normally drawn through the action of the spring 26 into engagement with the guide rod 22 in the tilted position. In the last-mentioned position the slide 12, by the occurring clamping action between the lock plate 24 and the guide rod 22, is locked to the guide rod 22 against movement towards the flat iron branch 4. However, the lock device described does not prevent movement of the slide 12 in the other direction.

At the upper end of the flat iron branch 4 a plate shaped abutment element 28 is pivotally supported on a pivot 30 extending along the upper edge of branch 4. The side edge of the element 28 extending on the same side as the catch arm branch 14 is bent away form the flat iron branch 4 for forming a side support surface 32. The function of the abutment element 28 and the side support surface 32 thereof will be described more closely below.

A guide 34 for a slide 36 extends below and parallel to the pivot 30 on the side of the flat iron branch 4 facing the flat iron branch 6. More particularly, the guide 34 is located so as to receive and movably support the upper end of the support rod 8 with play. As will be described more closely below this allows that the upper end of the support rod 8, when the device is under load, serves to lock the slide 36 in an extended position. The slide 36 is biased by means of a draw spring 38 towards the side of the frame 2, along which the catch arm branch 14 extends, and at its end facing away therefrom is bent in the same direction as the side support surface 32 for forming a further side support surface 40 facing the surface 32. Also the function of the slide 36 and the side support surface 32 will appear from the following description.

The function of the support unit described will now be explained more closely below with reference to FIG. 3.

After positioning the lock plate 24 in an upright position and thereby releasing the slide 12 and the catch arm 14, 16 for movement, the support unit is moved with drawn out catch arm 14, 16 into close vicinity of a leg 42 of a heavy object which shall be moved. With the wheel 10 resting on the floor the unit is then applied with the abutment element 28 engaging one side 44 of the leg and with the catch arm portion 16 located on the other side of the leg not shown in FIG. 3. The catch arm branch 16 is shifted into engagement with this side and the slide 36 is drawn out so that the side support surface 40 thereof comes into engagement with the facing leg side extending between the above-mentioned leg sides, said facing leg side bein neither visible in FIG. 3. The position of the support unit is then also adjusted so that the catch arm branch 14 and side support surface 32 come into engagement with the remaining side 46 of the leg. In the position thus obtained, shown in FIG. 3, the catch arm branch 16 is locked against further extension due to the fact that the locking plate 24 has been allowed to return to its locking position.

A further similar support unit is applied in the same way on a further leg, located at the same side of the object as the first leg. with the flat iron branch 6 directed in the same direction. The opposite side of the object can now be lifted so that the object will rest on the two wheels 10 and can be rolled away.

For releasing the support unit from a leg the catch arm 14, 16 must be disengaged so as to be able to be drawn out, by tilting the lock plate 24 into an upright position, so that it can be moved together with the slide 12 along the rod 22.

It is realized that the object at movement on the wheels 10 is safely anchored to the support units by virtue of their design. More particularly the abutment element 28 and the catch arm branch 16 will be pressed very hard against an opposite side each of the leg 42 of the object, and will thereby unshiftably clamp the leg therebetween, due to the movement caused by the lift action and applied upwards on the branch 6. This movement is determined by the reaction force from the floor at the wheel 10 as multiplied with the length of the branch 6. It is then also realized that the mutual position of the abutment element 28 and the branch 16, with the element 28 located above the branch 16 and on the wheel side of the leg 42, is important for the magnitude of the clamping force.

Sidewards stability is obtained by means of the support surfaces 32 and 40 and the catch arm branch 14. The slide 36 is then locked in its position by virtue of the fact that the end of the rod 8 is pressed against the slide due to the action of the above-mentioned moment.

If all legs of an object intended to be moved is provided with its particular support unit as indicted above, the object can easily be rolled on a frame floor without simultaneous lifting. The object must, however, be somewhat lifted when the support units are applied in order to make the object to get clear from the floor.

Of course, the invention is not limited to the embodiment described and shown. Thus, two wheels attached to a pivoted bracket can be used instead of the wheel 10 for allowing movement over small irregularities, e.g. thresholds. The abutment element 28, 32 can be replaced by parts having another shape for suiting other types of furniture or frame legs. For round legs, or similar, an abutment element with two angled abutment surfaces may thus be used, which centre the leg essentially in the symmetry plane of the unit, which extends in parallel with the flat iron branch 6 through the pivot axis of the wheel 10.

The transport device according to the invention is universally usable for moving objects. Its use within hospitals, homes and in connection with cleaning work, by removal firms, within the furniture and office equipment trade and similar is, however, of particular importance.

I claim:

1. A transport device for moving an object having a leg, the transport device by a support unit for a leg (42) of the object, said support comprising: a support frame, at least one wheel rotatably mounted to the support frame, a first abutment element supported by the support frame and arranged for engagement with a first side of the leg, a second abutment element being arranged to engage a second side of the leg opposite the first side of the leg, a releasable latch connecting the second abutment element to the support frame and being movable along a path, the releasable latch including a means for locking the releasable latch along the path.

2. A device according to claim 1, wherein said first and second abutment elements include first and second engagement surfaces, respectively, for contacting the leg.

3. A device according to claim 1, wherein said first abutment element includes a side support surface for supporting the leg transversely to the direction of the load applied by the object of the frame.

4. A device according to claim 2, wherein the first abutment element is pivotally connected to the support frame so that the first engagement surface is adaptable to the orientation and shape of the leg.

5. A device according to claim 1, wherein said first abutment element is removable.

6. A device according to claim 2, wherein the second engagement surface is substantially linear and arranged to engage the leg transversely thereto.

7. A device according to claim 1, wherein the first abutment element engages the leg at a higher position on the leg than the second abutment element.

8. A device according to claim 1, wherein the support frame has first and second frame branches substantially perpendicular to each other, said wheel (10) being rotatably mounted to the first frame branch and said releasable latch being slidably connected to the second frame branch, the latter ones being arranged to extend along and serve to hold the object at engagement of the engagement means against the leg.

9. A device according to claim 8, wherein said first abutment element is arranged at an upper end of the second frame branch.

10. A device according to claim 8, wherein the second abutment element has first and second abutment branches substantially perpendicular to each other, the first abutment branch being connected to the releasable latch, and the second abutment branch extends transverse to the second frame branch on a side facing away from the first frame branch.

11. A device according to claim 8, further comprising a third abutment element guided on the second frame branch and having a third engagement surface at one end thereof extending essentially parallel to the first frame branch.

12. A device according to claim 1, characterized in that at least one of the engagement means besides a main support portion, which carries direct wherein the second abutment element includes a second side support portion for the leg.

13. A device according to claim 1, wherein the first abutment element has a main support portion for the leg which is shaped with angled support surfaces and intended to carry direct lifting forces.

* * * * *

UNITED STATES PATENT AND TRADEMARK OFFICE
CERTIFICATE OF CORRECTION

PATENT NO. : 5,215,321
DATED : June 1, 1993
INVENTOR(S) : Goesta Ljungberg

It is certified that error appears in the above-indentified patent and that said Letters Patent is hereby corrected as shown below:

Col. 3, line 50, delete "by a support unit for a leg (42) of the object, said support".

Signed and Sealed this

Fourth Day of January, 1994

BRUCE LEHMAN

Attest:

Attesting Officer

Commissioner of Patents and Trademarks